W. W. DARLING.
RESILIENT WHEEL.
APPLICATION FILED AUG. 28, 1911.
1,036,579.
Patented Aug. 27, 1912.
2 SHEETS—SHEET 1.
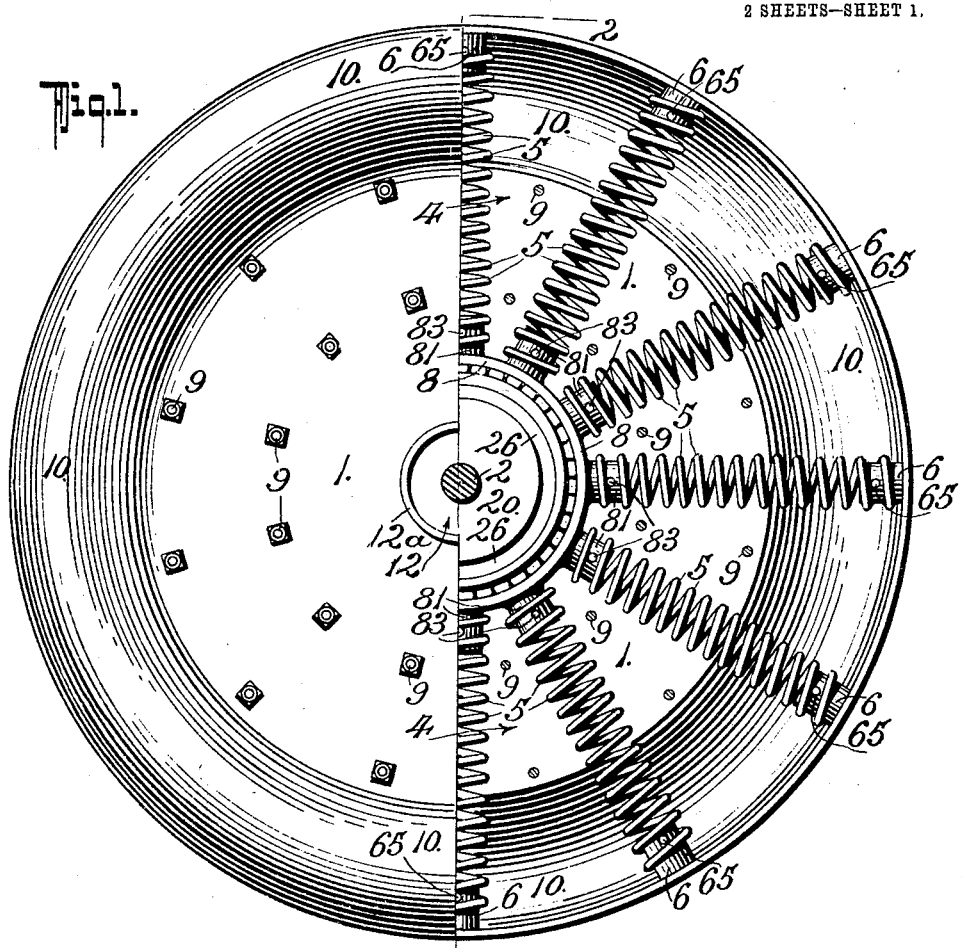
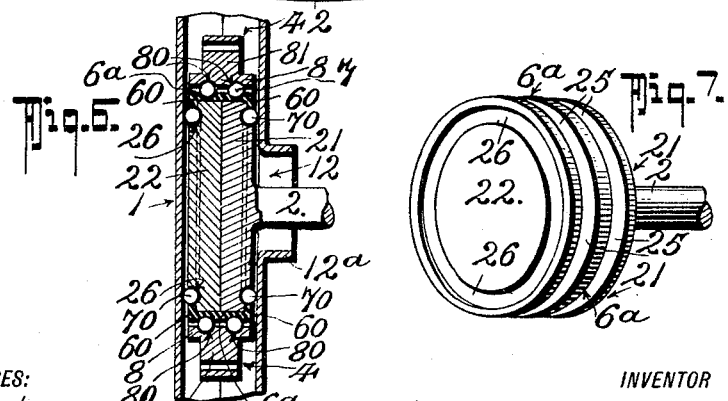
WITNESSES:
Haynard Woodard
John J. Schrott
INVENTOR
Wellington W. Darling
BY
Fred G. Dieterich
ATTORNEYS

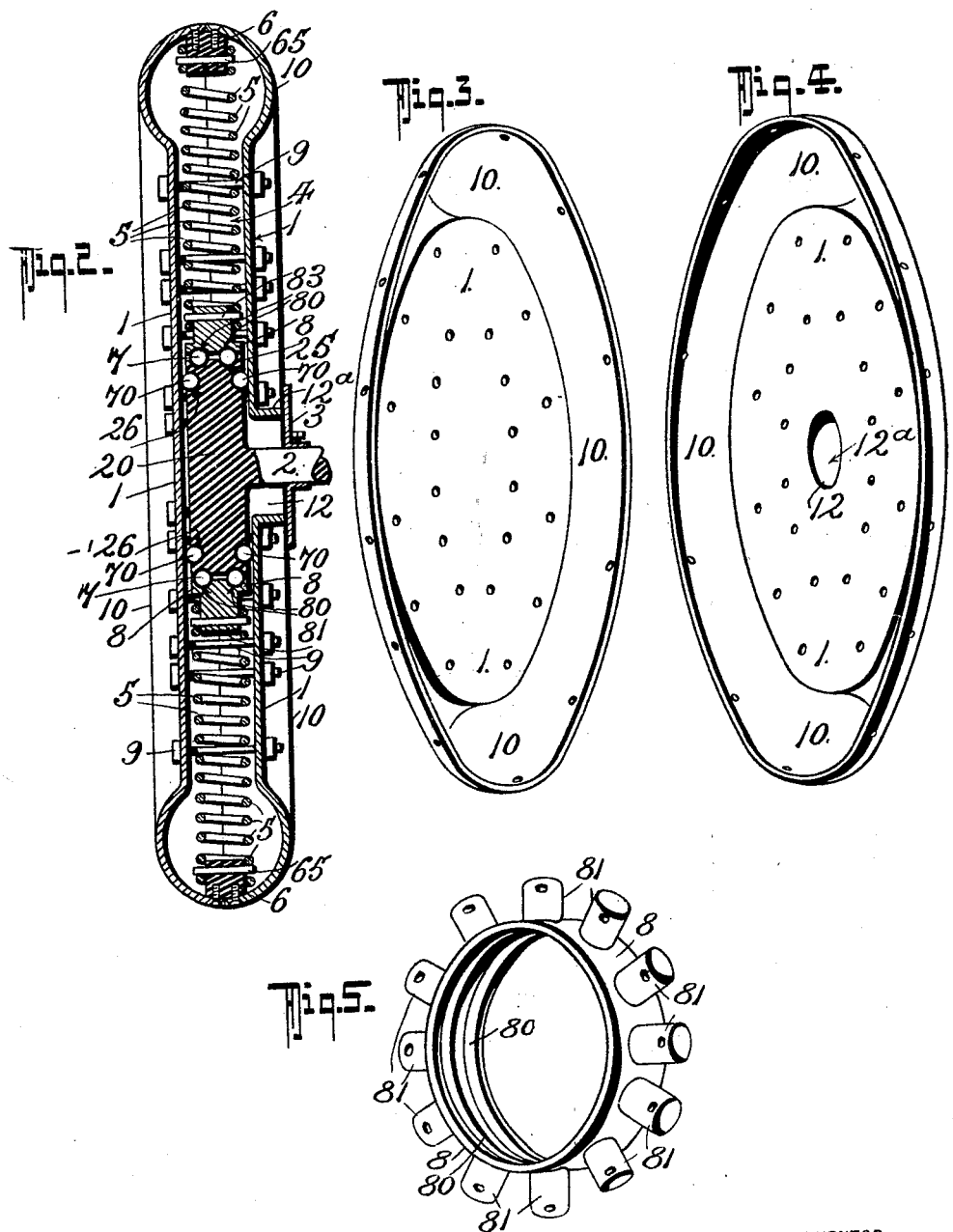

UNITED STATES PATENT OFFICE.

WELLINGTON W. DARLING, OF DELTA, COLORADO.

RESILIENT WHEEL.

1,036,579.  Specification of Letters Patent.  Patented Aug. 27, 1912.

Application filed August 28, 1911. Serial No. 646,364.

*To all whom it may concern:*

Be it known that I, WELLINGTON W. DARLING, residing at Delta, in the county of Delta and State of Colorado, have invented a new and Improved Resilient Wheel, of which the following is a specification.

This invention, which generally relates to wheels for motor vehicles and the like, more particularly has reference to that class of tubeless tire wheels in which spring devices are utilized for relieving the axle and running gear from shocks or jars.

Resilient wheels have heretofore been provided whose rims have movement relatively to and transversely of the axle, and in which radially disposed cushioning members between the rim and the axle are employed for taking up and distributing the jars and shocks, but such types of wheels, so far as I know, do not meet all the desired requirements for a safe and efficient wheel, of the type stated, and in which the use of a cushion tire is not required.

My invention primarily seeks to provide a wheel of the general type mentioned in which the resilient, or elastic portion, is so arranged, with respect to the axle and the wheel frame, that a substantially solid metal rim is utilized and the parts so designed and coöperatively arranged whereby to reduce the danger of dust or dirt entering between the wheel sections and the cushioning devices to the minimum and whereby the several parts can be readily separated and removed when necessary to get at any of the interior working parts of the wheel.

Another object of my invention is to provide an improved arrangement of parts whereby the hub and axle remain substantially stationary, that is,—have no vertical or lateral sagging movement, and whereby the desired flexibility necessary to act as a complete shock absorber is obtained.

With other objects in view that will hereinafter appear, my invention comprises an improved construction of a two-part metallic wheel body whose tread or rim portion is a solid tubular member and which is loosely mounted with respect to the axle and resilient connections interposed between the tubular portion of the wheel and the hub, for yieldingly sustaining the wheel with respect to the axle and hub and in which provision is also made for permitting a substantially universal motion of the wheel body on the axle and hub when the said wheel passes over obstructions or rough places.

In its more subordinate nature, my invention consists in certain details of construction and novel arrangement of parts, all of which will be hereinafter fully explained, specifically pointed out in the appended claims, and illustrated in the accompanying drawings, in which:—

Figure 1, is a side elevation, partly in section of my improved vehicle wheel. Fig. 2, is a vertical cross section thereof taken on the line 2—2 on Fig. 1. Fig. 3, is a perspective view of the outer shell member of the wheel. Fig. 4, is a similar view of the inner shell member hereinafter described in detail. Fig. 5, is a perspective view of the inner or hub bearing ring and spring rest. Fig. 6, is a detail section of a modified construction of the hub and the inner or hub bearing ring and, Fig. 7, is a perspective view of the modified form of hub.

In the practical application of my invention, the wheel is made up in different diameters to suit the standard sizes for automobiles, railroad or street cars, or other vehicle wheels and the said wheel comprises a body formed of two like half sections in the nature of steel plates that are pressed or otherwise formed, each having a flat portion 1 and a semi-circular tubular shaped rim 10, the two sections being opposites so that when the said two sections are joined and bolted up, their rim portions produce a substantially solid tubular rim, the parts being also so formed that the entire internal mechanism of the wheel is entirely incased or closed in to prevent the entrance of dirt or dust therein. One of the wheel body sections, hereinafter termed the inner section, has an axial opening 12 of larger diameter than the axle or shaft 2 on which the wheel is mounted and the edges of said opening are turned out to form an internal tubular extension $12^a$, the outer or open end of which is normally closed by a flexible cover 3, that hugs the axle 2 to keep out dirt, as is clearly shown in Fig. 2. The rim portions of the body sections lap over the inner side of the said sections and thereby, when the two sections are coupled up, produce an internal or hollow space between the inner and outer sections, which forms a chamber 4 for a series of radially disposed stout coil springs 5, which in my construction of wheel serve as substitutes for the usual wheel spokes since they support the wheel upon the axle. Each of the springs 5 is of a suitable length and they have their outer ends fitted upon and are secured to solid bearing blocks or studs 6, against the inside of the hollow but solid wheel rim and secured to the said rim in any approved manner.

20 designates the wheel hub which is preferably made integral with the axle as shown in Fig. 2, but may be of two parts, as shown in Fig. 6, which shows one part 21 as integral with the axle and the other part being in the nature of a disk 22 which may be loosely mounted with respect to the part 21 and held against the same by a ball bearing ring 6ª, the ends of which are bent over to form retaining flanges 60 when the parts are assembled. In the preferred arrangement of the hub 20, as shown in Fig. 2, the said hub has one or more annular grooves 25 that form races for the bearing balls 7, and in the opposite sides it has annular grooves 26 for the balls 70 that ride against the flat sides of the body sections when the parts are assembled.

8 designates a hub ring that has internal grooves 80—80 that form ball races for opposing the races 25—25 in the hub and the said ring also has a series of radial studs 81 to receive and support the lower or inner ends of coiled spring spokes 5, the said ends being secured by cross pins 83 that pass through the studs 81. The outer ends of the springs 5 are likewise secured to the rim studs 6 by the cross pins 65. By reason of the peculiar construction of the parts, as described, the hub 8 remains practically stationary, when the wheel, in striking and running over a rock or other object rises up, it being manifest that since the spoke connections with the hub are in the nature of stout coiled springs the said spokes yield sufficiently to act as cushions for relieving the axle and running gear as well as the occupant of the vehicle, from all shocks or jars.

In practice, the spring spokes are so made up that they have sufficient elasticity to yield while the vehicle travels rapidly over an object, and yet remain rigid to such an extent to sustain the weight of the machine and its occupant during the ordinary or smooth running of the vehicle, without causing the hub to sag to any marked degree below the axial center of the wheel.

By making the axial opening in the inside body plate 1 larger than the diameter of the axle provides sufficient free play for the wheel to allow it to move up, down or laterally without disturbing or hitting the axle.

9 designates the bolts that pass through the spaces between the radial spoke springs and secure the two half wheel body sections together.

From the foregoing taken in connection with the drawings, the advantages and complete construction and operation of my invention will be readily apparent.

The wheel construction stated overcomes the disadvantages evident in the use of the common type of pneumatic tires, materially reduces the costs of maintenance of auto wheels and at the same time produces a wheel that has the desired resistance necessary for motor vehicles and since no direct wear comes on the resilient devices they remain practically indestructible and maintain the conditions and rigidity desired in a wheel of the general type stated.

What I claim is:—

1. A resilient wheel comprising a hollow casing having a tubular formed tire, a hub and axle rotatable within the said casing, a ring around the said hub, resilient spokes composed of coiled springs held between the said ring and the periphery of the tubular formed tire portion of the casing, means for connecting the inner ends of the springs to the said hub engaging ring and other means for connecting the outer ends of the said springs to the tire portion of the casing.

2. In a vehicle wheel; a hollow casing including a peripheral tubular shaped tire portion and side plates, one of the plates having an axial aperture and an axle and hub projecting through the said aperture; of a ring mounted on the said hub having lugs, other lugs mounted on the inner face of the tubular portion of the casing and coil spring spokes interposed between the ring and the tire-like rim and means for holding the springs with their inner ends engaging the hub ring and their outer ends engaging the tubular rim portion.

3. A resilient wheel comprising a hollow casing having a tubular formed tire, said casing being composed of two half sections each including a disk portion, the inner disk portion having an axial opening, an axle projecting through said opening, a hub on the axle and within the casing, a ring loosely rotatable on the hub, said ring having radial lugs, other lugs secured on the inner periphery of the tubular tire portion, coiled springs interposed between the ring and the tire lugs and means for securing the opposite ends of the springs to the said lugs.

4. In a vehicle wheel, an axle having a hub, a ring loose on said hub and having radial lugs, two wheel disks each having their peripheral portions formed into a concavo-convex form in cross section to provide substantially semi-annular tire sections and body plate sections, said body plate sections being spaced apart a distance less than the diameter of said tire sections, lugs held within and secured to and uniting said tire
5 sections, spring spoke members having their ends secured to said ring and tire lugs, and means passing through said body portions to secure them over said hub, one only of said body portions having a shaft opening.

WELLINGTON W. DARLING.

Witnesses:
EMMA WATSON,
H. J. BAIRD.